United States Patent
Agrawal et al.

(10) Patent No.: US 12,487,791 B1
(45) Date of Patent: Dec. 2, 2025

(54) MANAGING DEVICE VISUAL PROJECTION ON A CONNECTED SECOND DEVICE WITH A SECOND DISPLAY IN SHARED STATE

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/795,055

(22) Filed: Aug. 5, 2024

(51) Int. Cl.
  *G06F 3/14* (2006.01)
(52) U.S. Cl.
  CPC .................. *G06F 3/1454* (2013.01)
(58) Field of Classification Search
  CPC ...... G06F 3/1454; G06F 9/452; G06F 3/1423; G06F 3/14; G06F 3/147; G09G 5/14; G09G 2370/16; H04N 7/15; H04L 65/403
  See application file for complete search history.

(56) References Cited

U.S. PATENT DOCUMENTS

| 11,928,383 | B2 * | 3/2024 | Zhang | G06F 3/04162 |
| 2024/0184501 | A1 * | 6/2024 | Wang | G06F 9/542 |

* cited by examiner

*Primary Examiner* — Koosha Sharifi-Tafreshi
(74) *Attorney, Agent, or Firm* — Isidore PLLC

(57) ABSTRACT

An electronic device, computer program product, and method provide autonomous projecting of a selected content to a second display. The device is configured to, in response to a trigger to transmit first content of the electronic device to a connected second electronic device for presenting on a second display: (i) determine whether second display content is currently being shared with at least one third electronic device; and (ii) in response to determining that the second display content is currently being shared with at least one third electronic device: (a) withhold automatic rendering of the first content on the second display; and (b) generate and output a notification presented on at least the first display, the notification informing a user of at least one of the electronic device and the second electronic device that the content presented on the second display is being shared.

20 Claims, 7 Drawing Sheets

MANAGING DEVICE VISUAL PROJECTION ON A CONNECTED SECOND DEVICE WITH A SECOND DISPLAY IN SHARED STATE

BACKGROUND

1. Technical Field

The present disclosure relates generally to electronic devices that present visual content, and in particular to electronic devices that provide content for presentation on an external display.

2. Description of the Related Art

Portable communication devices, particularly smartphones, have become ubiquitous. People all over the world use such mobile devices to stay connected and to share content using content sharing modalities available to such devices. The content sharing modalities can enable a user of a mobile device to transmit content to a second electronic device to be presented on a display of the second electronic device. One of the advantages of content sharing is the ability for the user of the mobile device to view the same content on a larger display of a second electronic device. With the larger display, the content can be easily navigated, thus providing the user a more immersive experience. In some situations, the user of the second electronic device is engaged in a collaborative or sharing session with others and may be sharing the contents of his/her screen with the other devices. In such situations, the user can inadvertently share private content from the first electronic device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
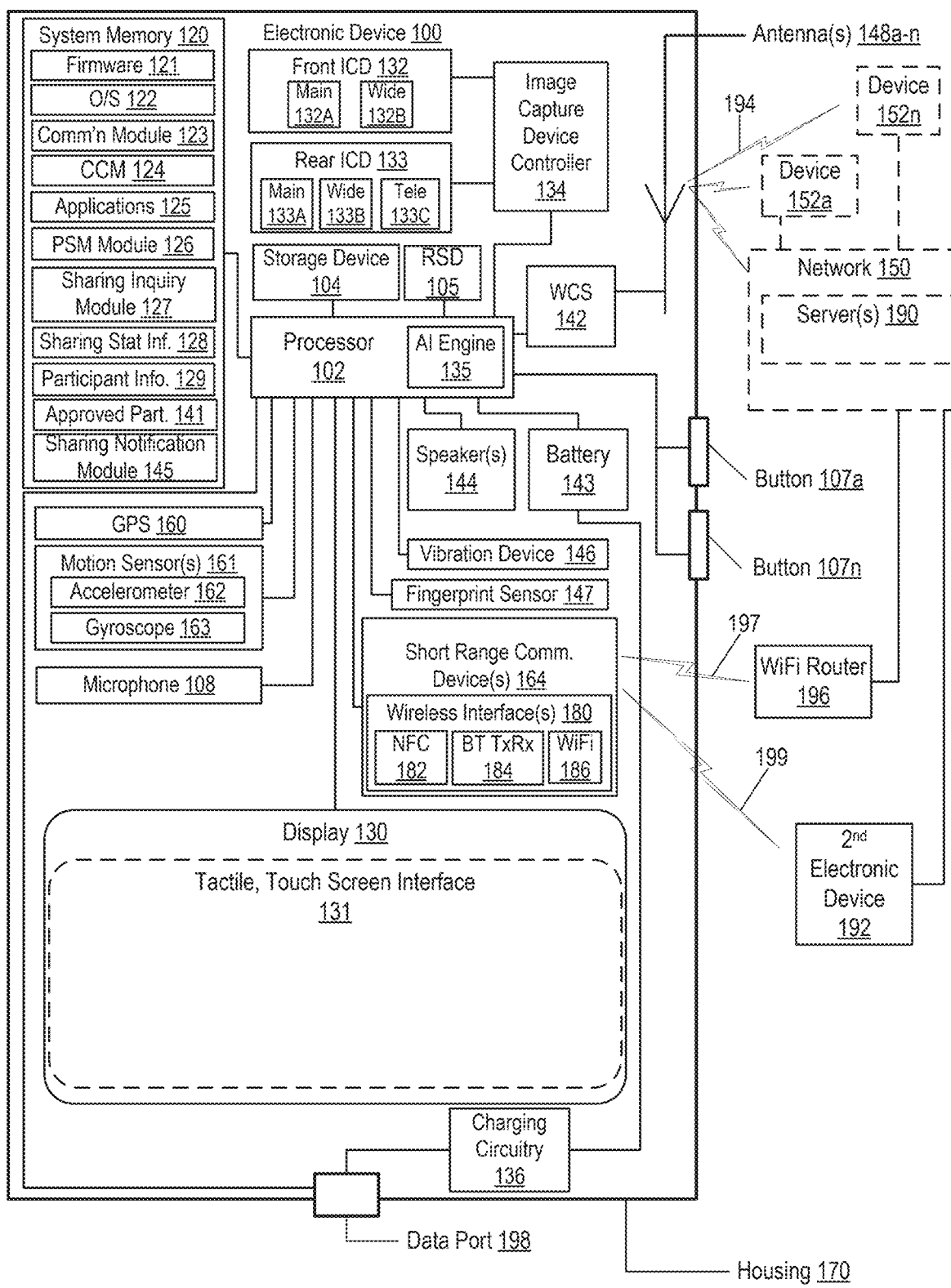
FIG. 1 depicts an example first electronic device within which various aspects of the disclosure can be implemented to prevent content selected for projection to and presentation on a second display of a second electronic device from being inadvertently shared with third devices that are communicatively coupled to the second device via a visual sharing session, according to one or more embodiments.

The present disclosure provides an electronic device, a method, and a computer program product that enable autonomous determination as to whether the electronic device can project visual content for presentation on a second display of a second electronic device based on second display sharing status received from the second electronic device. According to one or more embodiments, the electronic device includes a first display that is configurable to display one or more content, a communications subsystem configurable to connect the electronic device to a second electronic device and support content sharing from the electronic device to a second display of the second electronic device. The electronic device also includes a controller communicatively connected to the first display and the communications subsystem, is the controller being configured to cause the electronic device to: in response to a trigger to transmit first content of the electronic device to a connected second electronic device for presenting on a second display: (i) determine whether second display content is currently being shared in its entirety with at least one third electronic device; and (ii) in response to determining that the second display content is currently being shared in its entirety with at least one third electronic device: (a) withhold automatic rendering of the first content on the second display; and (b) generate and output a notification presented on at least the first display, the notification informing a user of at least one of the electronic device and the second electronic device that the second display content is being shared. In one or more embodiments, the electronic device is configured to project a copy of the first content to a window provided on the second display when the second display content is not being shared with the at least one third electronic device.

In one or more embodiment, the electronic device is configured to prompt for sharing status information from the second electronic device before each sharing of new content from the electronic device, the sharing status information indicating whether the sharing of the second display content comprises sharing, with the at least one third electronic device (i) all content presented on the second display, inclusive of the projected window, or (ii) sharing only some content presented on a portion of the second display that excludes the projected window presenting the first content of the electronic device. According to one aspect, generation and presentation of the notification is triggered only for situations where the entire second display screen, inclusive of the projected window, is being shared with the third-party electronic device. Also, in one or more embodiments, the notification is withheld where the third-party participants to the sharing session are known to the first user and/or included in an open/approved sharing group, the group being permitted to receive sharing of all content projected from the electronic device for presentation on the second display.

According to one or more embodiments, a method provides computer-implemented processes for enabling autonomous determination of whether an electronic device can project visual content to a second display of a second electronic device based on second display sharing status received from the second electronic device. The method includes: receiving a trigger to transmit first content of an electronic device to a connected second electronic device for presenting on a second display; determining whether all second display content is currently being shared with at least one third electronic device; and in response to determining that all the second display content is currently being shared with at least one third electronic device: (i) withholding automatic rendering of the first content on the second display; and (ii) generating and outputting a notification presented on at least the first display, the notification informing a user of at least one of the electronic device and the second electronic device that the second display content is being shared.

According to one or more embodiments, the disclosure may include a computer program product that includes a non-transitory computer readable storage device and program code on the computer readable storage device that when executed by a processor associated with an electronic device configures the processor to cause the electronic device to provide functionality of the above-described and additional method processes.

The present disclosure addresses issues that arise when a selected content is projected from a first electronic device to a second display of a second electronic device while the second display content (i.e., all presented content, including any shared content from the first electronic device) is being shared with one or more third electronic devices. The second electronic devices and the one or more third electronic device are actively participating in a sharing session, such as a video conference, which may be enabled via a video conferencing application and a network connectivity of each participating device. The sharing of the second display content with the third electronic device can cause the selected content projected from the first electronic device to be available to the user(s) of the third electronic device, participating in the sharing session, when the sharing of that projected content is not intended by a user of the first electronic device. Each user of the third electronic device can also be referred to as a participant in the sharing session. The selected content can include content related to chat messages and personal emails of the user of the first electronic device that he/she does not want to make available to the user(s) of the third electronic device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals to those of the previous figure(s). The specific numerals assigned to the elements are provided solely to aid in the description and are not meant to imply any limitations (structural, functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are merely exemplary and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest reasonable interpretation given the context in which that term is utilized.

As provided herein, the term "content" is not limited to only the content stored in the electronic device but can encompass content provided by an external source and retrieved by the electronic device. Further, the content can include a combination of one or more of image information, audio information and video information.

As further described below, implementation of the functional features of the disclosure described herein is provided within processing devices and/or structures and can involve use of a combination of hardware, firmware, and several software-level constructs (e.g., program code and/or program instructions and/or pseudo-code) that when executed provide a specific utility or a specific functional logic for the device. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted examples are not meant to imply architectural or other limitations with respect to the presently described embodiments and/or the general invention. The descriptions of the illustrative embodiments can be read in conjunction with the accompanying figures. Embodiments incorporating teachings of the present innovation are shown and described with respect to the figures presented herein.

FIG. 1 depicts an example first electronic device within which various aspects of the disclosure can be implemented to prevent content selected for sharing/projection from being inadvertently shared with a third device, according to one or more embodiments. Examples of such electronic devices include, but are not limited to, a mobile device, a notebook computer, a mobile phone, a digital camera, a smart watch, and a tablet computer, etc. Electronic device 100 (also referred to as a first electronic device) includes processor 102, which is communicatively coupled to storage device 104, system memory 120, input devices, introduced below, output devices such as display 130, and image capture device (ICD) controller 134. Processor 102 can include processor resources such as a central processing unit (CPU) that support computing, classifying, processing, and transmitting of data and information. Electronic device 100 includes a plurality of image capturing devices, presented as front and rear facing cameras 132, 133. The ICD controller 134 may perform or support functions such as, but not limited to, selecting and activating an active camera from among multiple cameras. Throughout the disclosure, the term image capturing device is utilized interchangeably with front or rear facing cameras 132, 133.

System memory 120 may be a combination of volatile and non-volatile memory, such as random-access memory (RAM) and read-only memory (ROM). System memory 120 can store program code or similar data associated with firmware 121, an operating system 122, communication (comm'n) module 123, camera control module (CCM) 124, applications 125, screen projection/sharing/mirroring (PSM) module 126, sharing inquiry module 127 and sharing notification module 145. Communication module 123 includes program code that is executed by processor 102 to enable electronic device 100 to communicate with other external devices and systems.

The PSM module 126 includes program code that is executed by processor 102 to enable the electronic device 100 to screen share or mirror selected content accessible by the electronic device 100 to a second display of a second electronic device 192. Different techniques can be used by electronic device 100 (e.g., via execution of PSM module 126 by processor 102) to project the selected content to the second display. Techniques corresponding to the projection of the content can be referred to as mirroring, sharing, etc., where all or part of the visual content generated for presentation on the local display can be presented (or duplicated) on a second device display. In one or more embodiments, the PSM module 126 can be implemented to operate with a second device sharing inquiry module 127 which can be configured to request sharing status information 128 from the second electronic device 192. In one or more embodiments, the sharing status information 128 can include information that indicates whether the second electronic device 192 is sharing the content of the second display to a third electronic device. In one or more embodiments, the second electronic device 192 is engaged in a sharing session, such as a video conference session, in which content presented on the second device display (referred to hereinafter as second display content) can be shared for viewing on a third display of a third electronic device communicatively connected to and/or participating in the sharing session. In one or more embodiments, the sharing inquiry module 127 can also be configured to request sharing participant information 129 from the second electronic device 192. The sharing participant information 129 can include information about the second user(s) (also referred to as sharing participants or simply participants) of the third electronic device. In one or more embodiments, the sharing inquiry module 127 can be configured to request the sharing status information 128 before any projection of content from the first electronic device can be started. In one or more embodiments, the sharing inquiry module 127 can be configured to request the sharing status information 128 periodically after the projection of the first device content has started. It is appreciated that when the second display content is shared with a third electronic device, the second display content, including the selected content projected from the electronic device 100, is presumed to be exposed to the sharing participants.

Processor execution of the sharing notification module 145 can generate a first notification to be presented within the display 130 when the processor 102 determines from the received sharing status information 128 that the second electronic device 192 is sharing the second display content with another device. In one or more embodiments, processor execution of the sharing notification module 145 can also generate a second notification containing information related to the sharing and can transmit the second notification to the second electronic device to be presented within the second display of the second electronic device 192.

In one or more embodiments, processor execution of the PSM module 126 can identify whether the sharing participants include people who have been explicitly or implicitly approved by the user of the electronic device 100 as ones who can receive or be shown the selected content projected from electronic device 100. As described above, the sharing participant information 129 is received from the second electronic device 192. In one or more embodiments, when the sharing participants are determined by the processor 102 to be family members of the user of the electronic device 100 or people who are associated with the same organization as the user of the electronic device 100, the sharing participants are implicitly approved by the user of the electronic device 100 to be exposed to the selected content projected to the second display. In one or more embodiments, when the sharing participants are determined by the processor 102 to be people who have been previously approved by the user of the electronic device 100, the sharing participants are considered to be explicitly approved by the user of the electronic device 100, and the selected content projected to the second display can be exposed to the sharing participants. It is appreciated that the sharing participants can include a combination of people who are implicitly and explicitly approved. In one or more embodiments, information about approved sharing participants can be stored in a cloud-based storage connected with server computing system 190, and that information/data can be downloaded and stored in the memory 120 of the electronic device 100 noting approved participants 141. In one or more embodiments, the user of the electronic device 100 can explicitly approve the sharing participants by acknowledging and approving the sharing participants using a user interface.

When the electronic device 100 is a device with a display 130 that supports having one open window at a time (e.g., a smart phone), the projection of the selected content from the display 130 includes the projection of the content of one window. In one or more embodiments, when the electronic device 100 is a device with a display 130 that supports having multiple open windows at a time, the projection of the selected content from the display 130 can include the projection of the content of more than one window. In one or more embodiments, processor execution of the PSM module 126 configures the processor 102 to identify the selected content to be projected to the second display of the second electronic device 192. The selected content can include content of one or more windows presented within the display 130. For example, a first window can include content related to chat messaging, a second window can include content related to personal emails, and a third window can include content related to a work project. It is appreciated that some embodiments provide that only a single application window is presented at a time on display 130 and it is that application window that can be projected/shared/mirrored to the second electronic device. When multiple windows are being concurrently presented in a split screen implementation of display 130, the entire set of windows can be presented as a single shared screen representation of the content of display 130. In one or more embodiments, processor 102 is configured to stop or withhold the projection of the selected content to the second display. For example, when the sharing status information 128 indicates that the content of the second display is being shared with the third electronic device(s), and the participants associated with the third electronic device(s) are determined by the processor 102 as people who are not implicitly or explicitly approved to view content shared from the first electronic device, the processor 102 is configured to stop the projection or to not start the projection. In one or more embodiments, processor 102 is configured to stop the projection or not start the projection when there is at least one sharing participant who is not implicitly or explicitly approved.

In one or more embodiments, when the display 130 is concurrently displaying multiple windows, processor 102 is configured to determine how much of the selected content is projected/shared to the second display. For example, when the sharing status information 128 indicates that the content of the second display is being shared with the third electronic device(s), the processor is configured to restrict the projection of the selected content such that content of certain windows (e.g., personal email window and chat messaging widow) can be excluded from being part of the projection, while allowing the projection of a selected window (e.g., work project window) to continue when at least one of the sharing participants is determined as not having previously approved.

Although depicted as being separate from applications 125, the CCM 124, the PSM module 126, the sharing inquiry module 127, the sharing notification module 145, and the communication module 123 may each be implemented as an application. Additionally, the functionality of the PSM module 126, the sharing inquiry module 127, the sharing notification module 145 can be integrated into a single application. Processor 102 loads and executes program code of the various modules stored in system memory 120. Examples of program code that may be loaded and executed by processor 102 include program code associated with communication module 123 and applications 125 and program code associated with the PSM module 126, sharing inquiry module 127, and the sharing notification module 145.

According to one or more embodiments, electronic device 100 includes removable storage device (RSD) 105, which is inserted into an RSD interface (not shown) that is communicatively coupled via system interlink to processor 102. According to one or more embodiments, RSD 105 is a computer readable storage device encoded with program code and corresponding data, and RSD 105 can be interchangeably referred to as a non-transitory computer program product or non-transitory computer readable storage device having non-transitory computer readable program code/instructions. RSD 105 may have a version of PSM module 126 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Front facing cameras (or image capture device (ICD)) 132 are communicatively coupled to ICD controller 134, which is communicatively coupled to processor 102. ICD controller 134 supports the processing of signals from front facing cameras 132. Front facing cameras 132 can capture images that are within the field of view (FOV) of image capture device 132. Electronic device 100 includes several front facing cameras 132. First front facing camera 132A is a main camera that captures a standard angle FOV. Second front facing camera 132B is a wide-angle camera that captures a wide angle FOV. Front facing cameras 132A and 132B can be collectively referred to as front facing cameras 132A-132B or front facing camera(s) 132. While two front facing cameras 132A-132B are shown, electronic device 100 can have more or less than two front facing cameras.

Electronic device 100 further includes several rear facing cameras 133. First rear facing camera 133A is a main camera that captures a standard angle FOV. Second rear facing camera 133B is a wide-angle camera that captures a wide angle FOV. Third rear facing camera 133C is a telephoto ICD that captures a telephoto FOV (zoom or magnified). Each rear facing camera 133A, 133B, and 133C is communicatively coupled to ICD controller 134, which is communicatively coupled to processor 102. ICD controller 134 supports the processing of signals from rear facing cameras 133A, 133B and 133C. Rear facing cameras 133A, 133B and 133C can be collectively referred to as rear facing cameras 133A-133C or rear facing cameras 133. While three rear facing cameras are shown, electronic device 100 can have less than three rear facing cameras, such as having only one or two rear facing cameras or can have more than three rear facing cameras.

Electronic device 100 can further include data port 198, charging circuitry 136, and battery 143. Electronic device 100 further includes microphone 108, one or more output devices such as speakers 144, and one or more input buttons 107a-107n. Input buttons 107a-107n may provide controls for volume, power, and image capture device 132. Microphone 108 can also be referred to as audio input device 108. Microphone 108 and input buttons 107a-n can also be referred to generally as input devices.

Electronic device 100 further includes wireless communication subsystem (WCS) 142, which is coupled to antennas 148a-148n. According to one or more embodiments, WCS 142 can include a communication module with one or more baseband processors or digital signal processors, one or more modems, and a radio frequency (RF) front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150. In one embodiment, network communication devices 152a-152n contain electronic communication equipment to allow communication with electronic device 100.

Short range communication device 164 is a low powered transceiver that can wirelessly communicate with other devices. Short range communication device 160 includes wireless interface 180 configured using one or more of software and hardware to enable the electronic device 100 to connect to other devices using different communication protocols. For example, the wireless interface 180 includes one or more of near field communication (NFC) device 182 for connecting to a NFC network, a Bluetooth transceiver device 184 for connecting to a Bluetooth network, and/or a wireless fidelity (Wi-Fi) device 186 for connecting to a wireless fidelity (WiFi) network.

Wireless network 150 is communicatively coupled to WiFi router 196. Wireless network 150 further allows electronic device 100 to wirelessly communicate with second electronic devices 192 via communication signals 197 transmitted by short range communication device(s) 164 to and from WiFi router 196. The second electronic devices 192 can be similarly connected to wireless network 150 via one of network communication devices 152a-n. According to one or more embodiments, wireless network 150 can include one or more servers 190 that support exchange of wireless data and video and other communication between electronic device 100 and second electronic device 192.

In one embodiment, electronic device 100 can receive internet or WiFi based calls via short range communication device 164. In one embodiment, electronic device 100 can communicate with WiFi router 196 wirelessly via short range communication device 164. In an embodiment, WCS 142, antennas 148a-n and short-range communication device(s) 164 collectively provide communication interface(s) of electronic device 100. These communication interfaces enable electronic device 100 to communicatively connect to at least one second electronic device 192 directly or via at least one network. In one or more embodiments, the projection of the selected content performed by the PSM module 126 to the second display can be supported/established by a peer-to-peer connection using one of these short-range communication devices 164. For example, short range communication device 164 can wirelessly communicate with second electronic device 192 via local communication signals 199.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. According to one aspect of the disclosure, display 130, speakers 144, and vibration device 146 can generally and collectively be referred to as output devices. Fingerprint sensor 147 can be used to provide biometric data to identify or authenticate a user. GPS device 160 can provide time data and location data about the physical location of electronic device 100 using geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. According to one or more embodiments, the measurements of these various sensors can also be utilized by processor 102 in the determining of the context of a communication. Electronic device 100 further includes housing 170 that contains/protects the components of electronic device 100.

Figure 2:
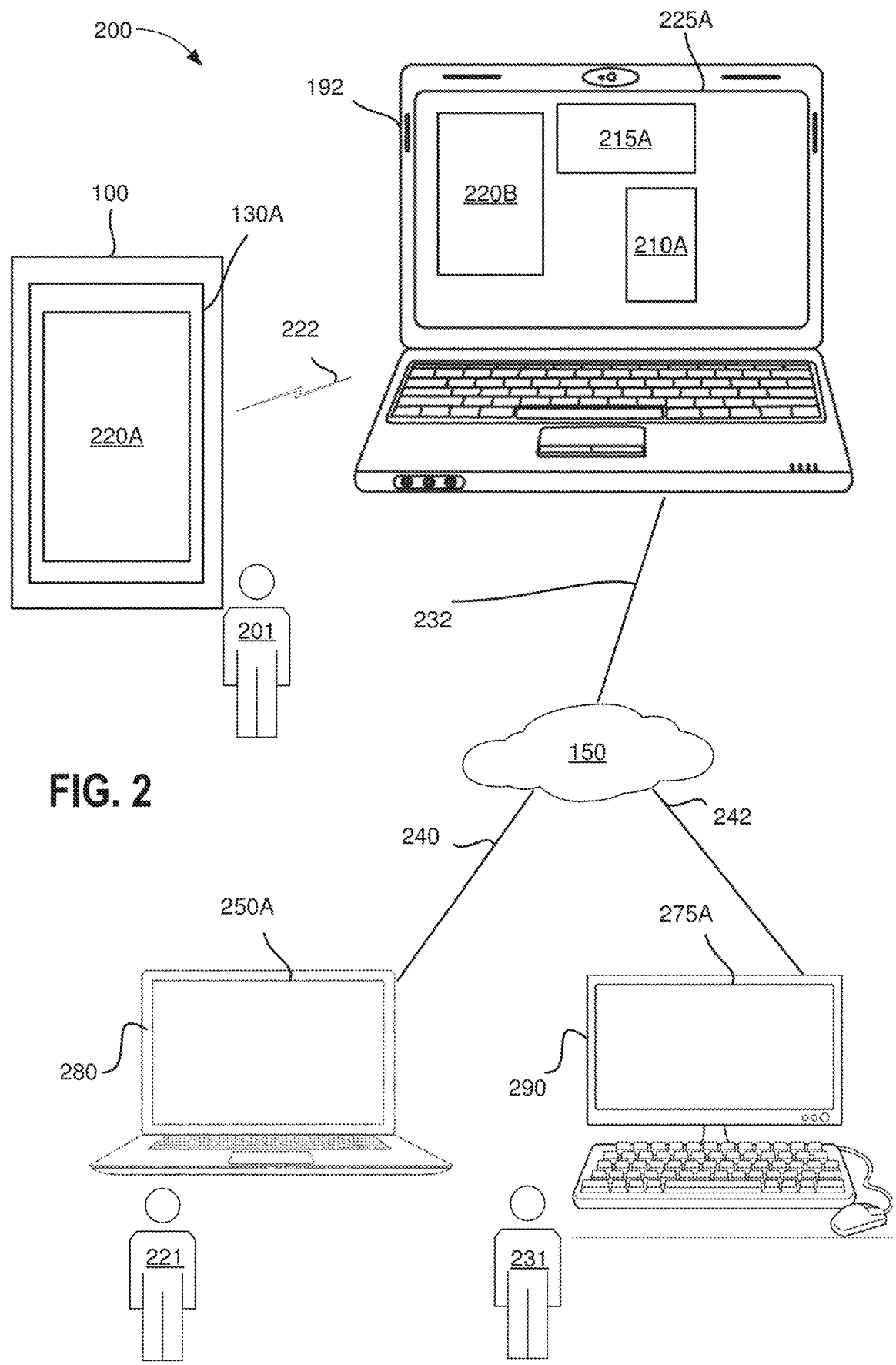
FIG. 2 depicts an example projection scenario in which an electronic device projects a selected content to a second display of a second electronic device to enable a user of the electronic device to view the same selected content on the second display for an improved viewing experience, according to one or more embodiments.

FIG. 2 depicts an example projection scenario by which an electronic device 100 projects a selected content from a first display 130A to a second display 225A of a second electronic device 192 to enable a user 201 of the electronic device 100 to view the same selected content on the second display 225A for an improved viewing experience, according to one or more embodiments. The connection 199 between the electronic device 100 and the second electronic device 192 can be implemented using a short-range communication protocol. For example, the connection can be a wireless connection using near field communication (NFC) or Bluetooth, or a wired connection using micro-USB.

The projection of the selected content from the first display 130A can be initiated by user 201 by issuing a projection or link and share command via a user interface. The projection can be performed by the processor execution of PSM module 126 and can cause a copy of the content of the display 130A to be projected to the second display 225A. FIG. 2 also depicts the second electronic device 192 being communicatively connected to the network 150 (FIG. 1) via connection 232 and the third electronic devices 280 and 290 being connected to the network 150 via connections 240 and 242 respectively.

In one or more embodiments, a selected content can include content of a window presented within the display 130A. Diagram 200 shows the display 130A (or first display) of first electronic device 100 with window 220A open thereon. For example, the window 220A can include content related to a presentation that the user 201 wants to view on the display 225A of the second electronic device 192. It is appreciated that both of the first display 130A and the second display 225A are accessible to the user 201.

In the scenario where received sharing status information 128 indicates that the content of the second display 225 (or second display content) is not being shared with one or more of the participants 221 and 231 via the third electronic devices 280 and 290, the selected content of the display 130A is projected to the second display 225A and the window corresponding to the window 220A is visible within the second display 225A as window 220B. It is appreciated that the second display 225A can include other windows such as windows 210A and 215A that are not projected from the electronic device 100 and are locally generated by the second electronic device 192. As depicted in FIG. 2, since the second display content is not being shared with the third electronic devices 280 and 290, none of the windows 210A, 215A and 220B is shown within the display 250A and 275A of the respective third electronic devices 280 and 290, and therefore the content of the windows 210A, 215A and 220B are not visible to the participants 221 and 231. In this scenario, the features of the disclosure are not required as no sharing of displayed content to third parties is occurring.

Figure 3A:
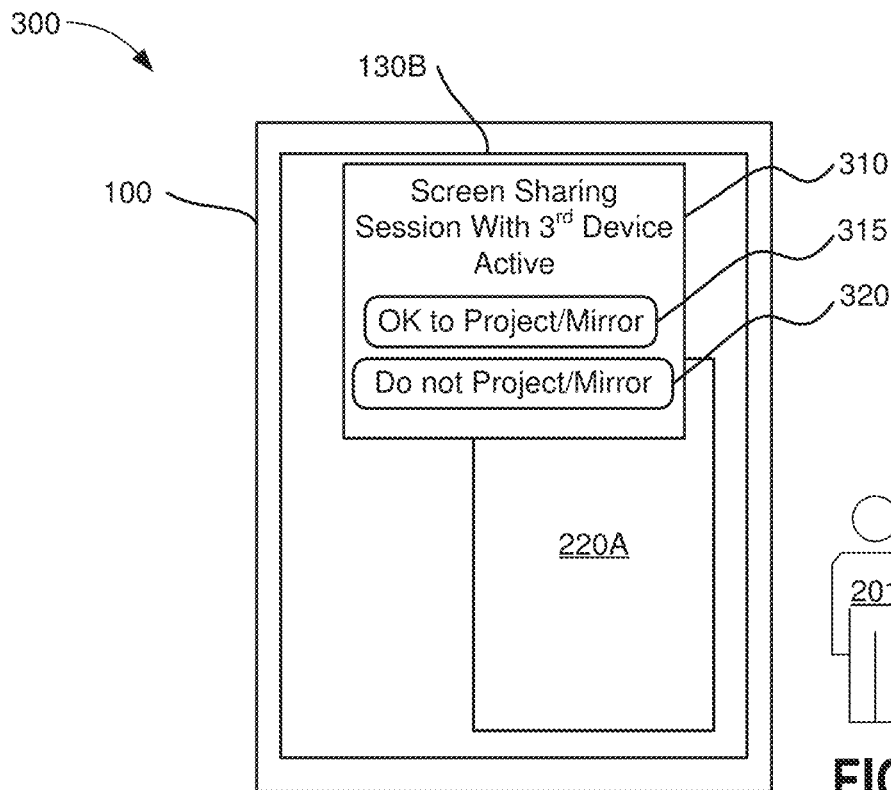
FIGS. 3A and 3B depict different example notifications to notify the user of the first and second electronic devices about the sharing status of the second electronic device, according to one or more embodiments.
Figure 3B:
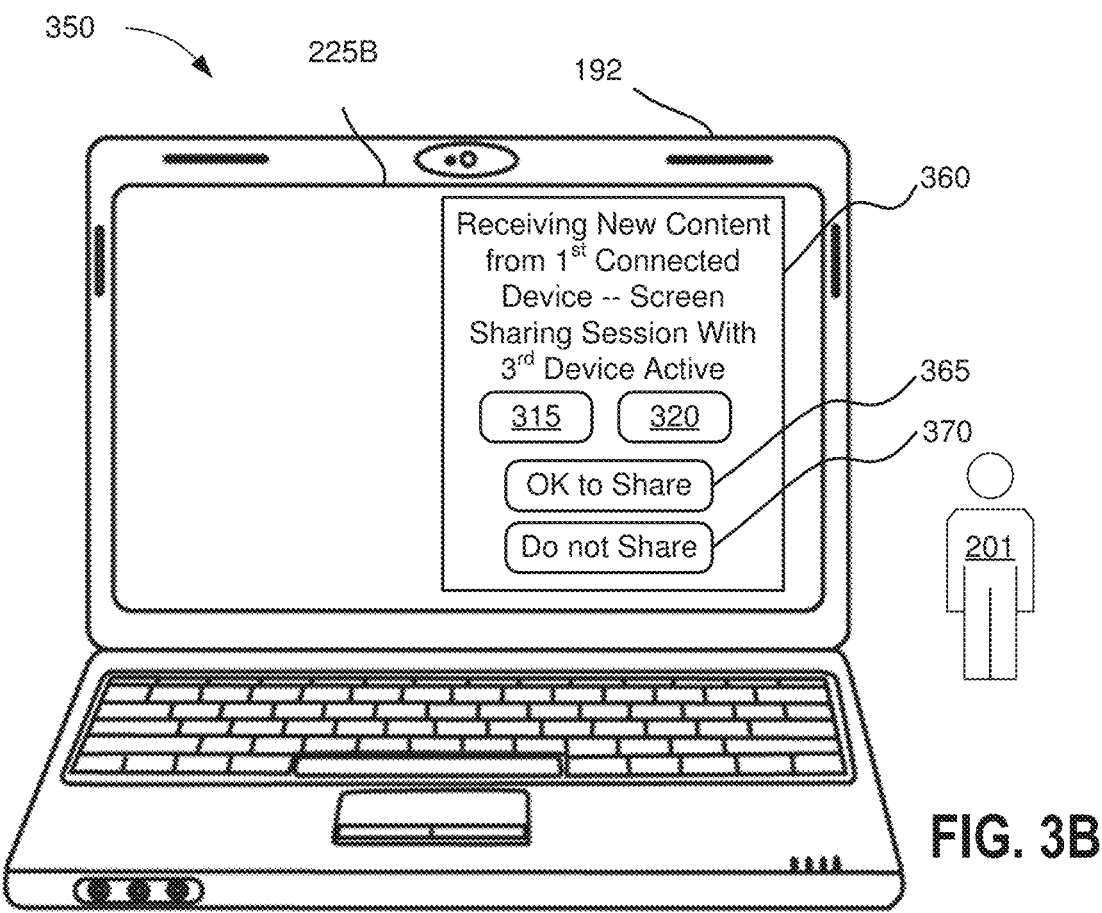

FIGS. 3A and 3B depict different example notifications generated and presented on respective display screens 130A and 130B to notify the user 201 of the first and second electronic devices 100, 192 about the sharing status of the second electronic device 192, according to one or more embodiments. Diagram 300 includes second device display 130B with window 220A. In one or more embodiments, when the electronic device 100 receives the sharing status information 128 from the second electronic device 192, and based on the processor 102 determining from the sharing status information 128 that the second electronic device 192 is sharing the second display content presented on the display 225A (FIG. 2) with a third electronic device 280 and 290, a first screen sharing notification 310 is generated and presented within the display 130B. For example, the first screen sharing notification 310 can be "Screen Sharing Session With $3^{rd}$ Device Active."

In one or more embodiments, the first notification 310 can include or is presented with selectable option(s) 320 to enable the user 201 to decide whether to withhold/abort the projection/presentation of the selected content to the second display 225A and/or block sharing of the content that is received from the first display 130A. In one or more embodiments, the first notification 310 can also include selectable option(s) 315 to enable the user 201 to approve the projection of the selected content to the second display 225B even with knowing that the second display 225A is sharing the second display content to the third electronic device 280 and 290.

In one or more embodiments, when the electronic device 100 receives the sharing status information 128 from the second electronic device 192, and based on the processor 102 determining from the sharing status information 128 that the second electronic device 192 is sharing the second display content to third electronic device 280 and 290, a second screen-sharing notification 360 is generated and transmitted to the second electronic device 192 to be presented within the second display 225B of the second electronic device 192. The second notification 360 can include information related to the sharing status information 128 as well as information to indicate that new content (e.g., a new app window) is being presented on electronic device 100 and is available for mirroring or projecting on second display 225B. For example, the second screen sharing notification 360 can be "Receiving New Content from 1st Connected Device—Screen Sharing Session With 3rd Device Active." Notably, the automatic mirroring feature is suspended when the second device is in a display sharing session with a third device, and the automatic sharing is replaced with the presentation of second screen sharing notification 360.

In one or more embodiments, the second notification 360 includes selectable option to enable the user 201 to approve or to not approve sharing of the content received from the first electronic device 100 with third electronic device 280 and 290. In one or more embodiments, the first electronic device 100 can be configured to request an approval indication relating to the second screen-sharing notification 360 from the second electronic device 192. As shown, second screen-sharing notification 360 can include selectable option(s) 315, 320 to enable the user 201 to decide whether to approve the projection/mirroring of the selected content to the second display 225B. Second notification 360 can also include selectable option(s) 365 to enable the user 201 to decide whether to approve sharing of the received selected content that is then presented on second display 225B with the third electronic device(s) via the sharing session. In one or more embodiments, the projection/mirroring of the selected content to the second display 225B cannot be started unless user approval for the projection/mirroring is received via selectable option 315 of the second screen-sharing notification 360 presented on the second electronic device 192. In one or more embodiments, second screen-sharing notification 360 can also include selectable option(s) 370 to enable the user 201 to decide whether to disapprove sharing of the received selected content, which is presented on second display 225B, with the third electronic device(s) via the sharing session.

It is appreciated that the second display 225B is shown with no window projected from first display 130A of the electronic device 100 during presentation of second notification 360. However, existing windows presented on second display 225B can continue to be presented and shared via the video sharing session.

Figure 4:
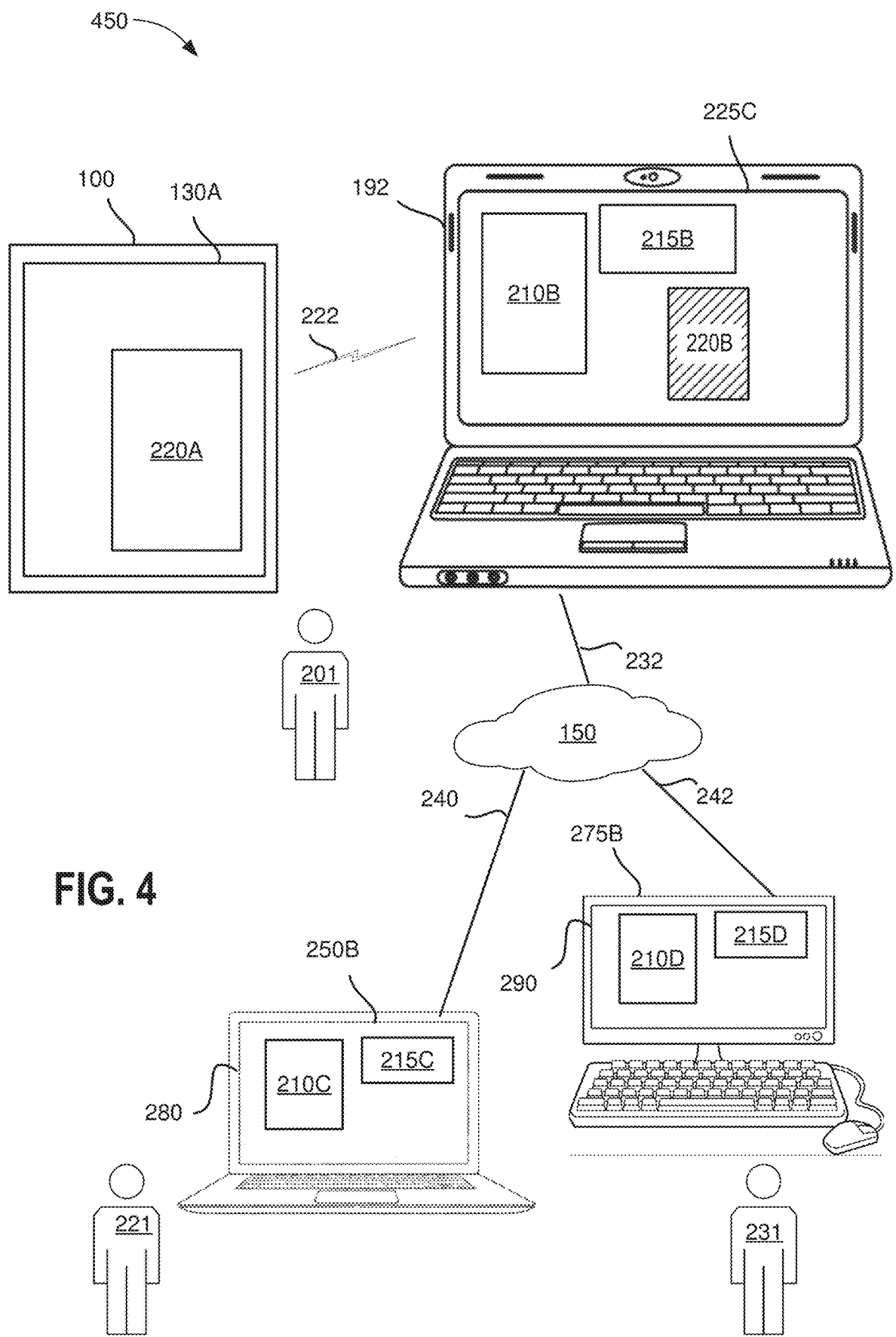
FIG. 4 depicts an example projection scenario in which an electronic device withholds/aborts a projection of a selected content to a second display upon determining that the second display is sharing the second display content with a third electronic device, according to one or more embodiments.

FIG. 4 depicts an example projection scenario in which an electronic device 100 withholds/aborts a projection of a selected content to a second display based on determining that the second display is sharing the second display content with third electronic device(s), according to one or more embodiments. Diagram 400 shows the electronic device 100 with display 130A and the second electronic device 192 with second display 225C. The second display content within the second display 225C is being shared with the third electronic devices 280 and 290. For one or more embodiments, based on receiving a decision to withhold/abort the projection of the selected content (e.g., the content of the window 220A) to the second display 225C, the processor is configured to withhold/abort the projection of the selected content to the second display 225C.

Diagram 400 shows the content of the window 220B in the second display 225C with hashed lines to convey that the content of the window 220B is not visible in the second display 225C because the projection of the content of the corresponding window 220A has been withheld/aborted. It is appreciated that the windows 210B and 215B within the second display 225C are still being shared with the third electronic devices 280 and 290 because they are not being projected from the electronic device 100. The windows corresponding to the windows 210B and 215B are shown as windows 210C and 215C in the display 250B of the third electronic device 280. Similarly, the windows corresponding to the windows 210B and 215B are shown as windows 210D and 215D in the display 275B of the third electronic device 290.

Figure 5:
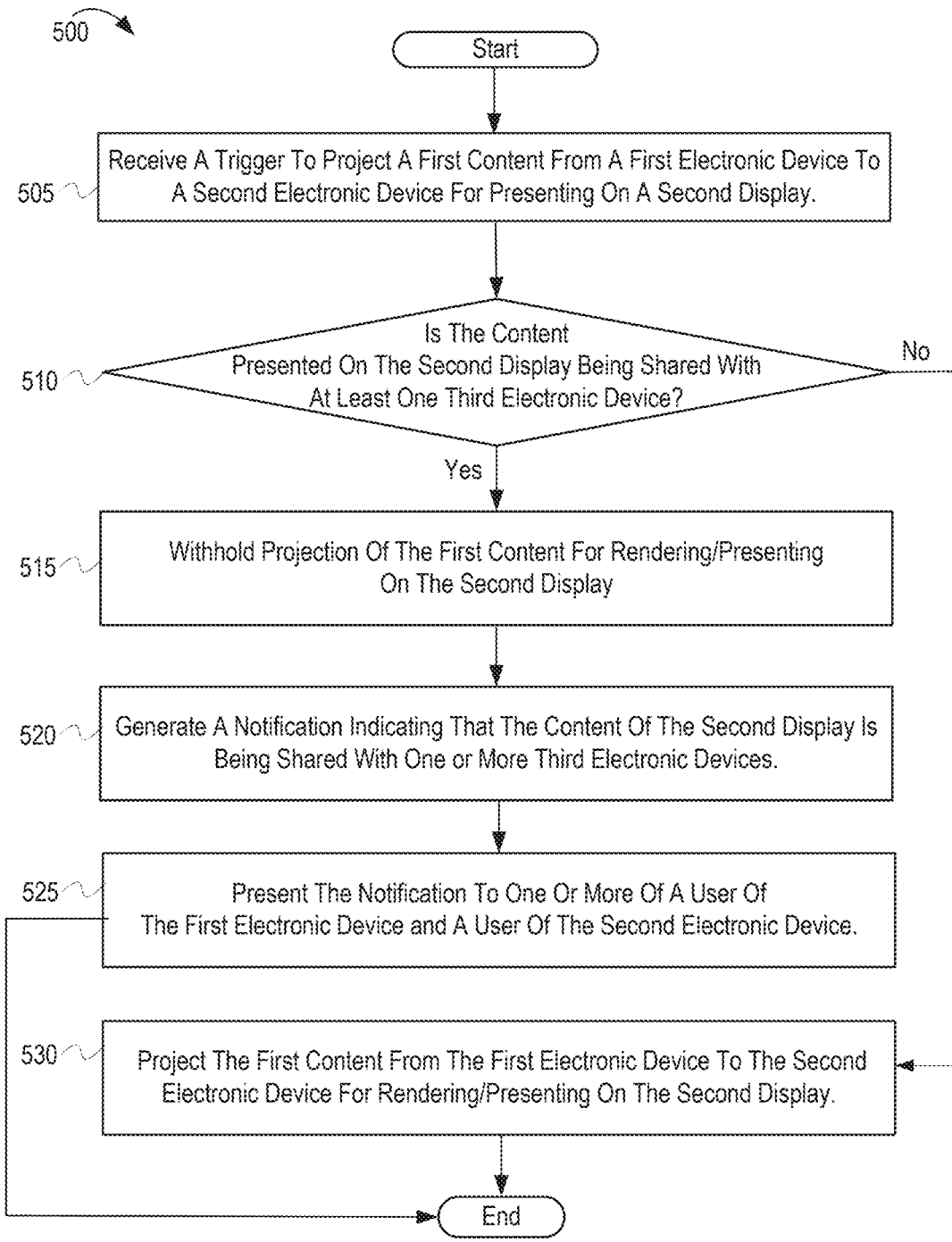
FIG. 5 depicts an example method for presenting a notification to at least one of the a first electronic device and a second electronic device and projecting a selected content from the first electronic device to a second display of the second electronic device based on whether the second display content is being shared with the at least one third electronic device, according to one or more embodiments.
Figure 6:
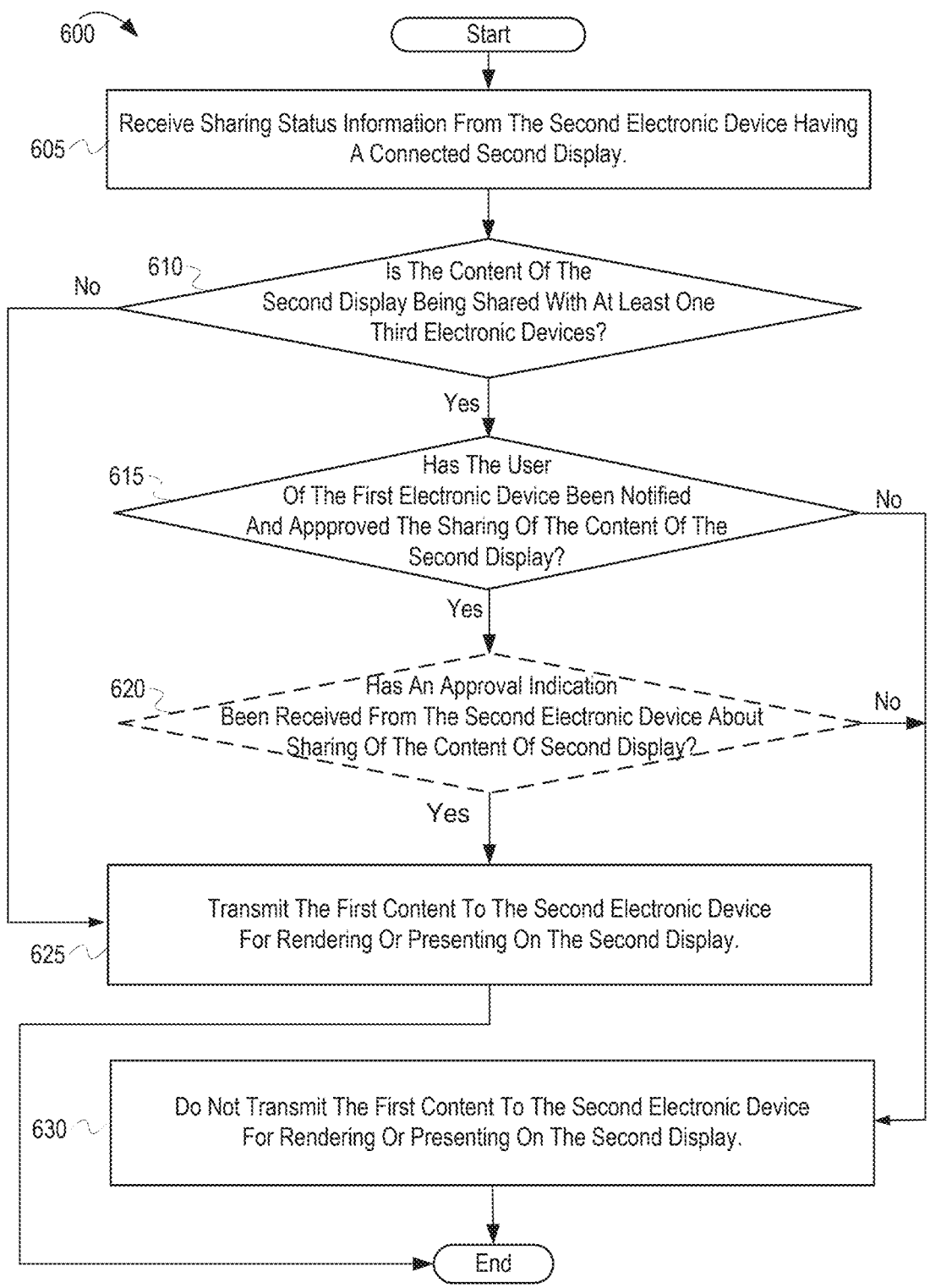
FIG. 6 depicts an example method for receiving sharing status information from a second electronic device and for determining whether to project the content by the electronic device to a second display based on an indication that the content of the second display is being shared with at least one third electronic device, according to one or more embodiments.
Figure 7:
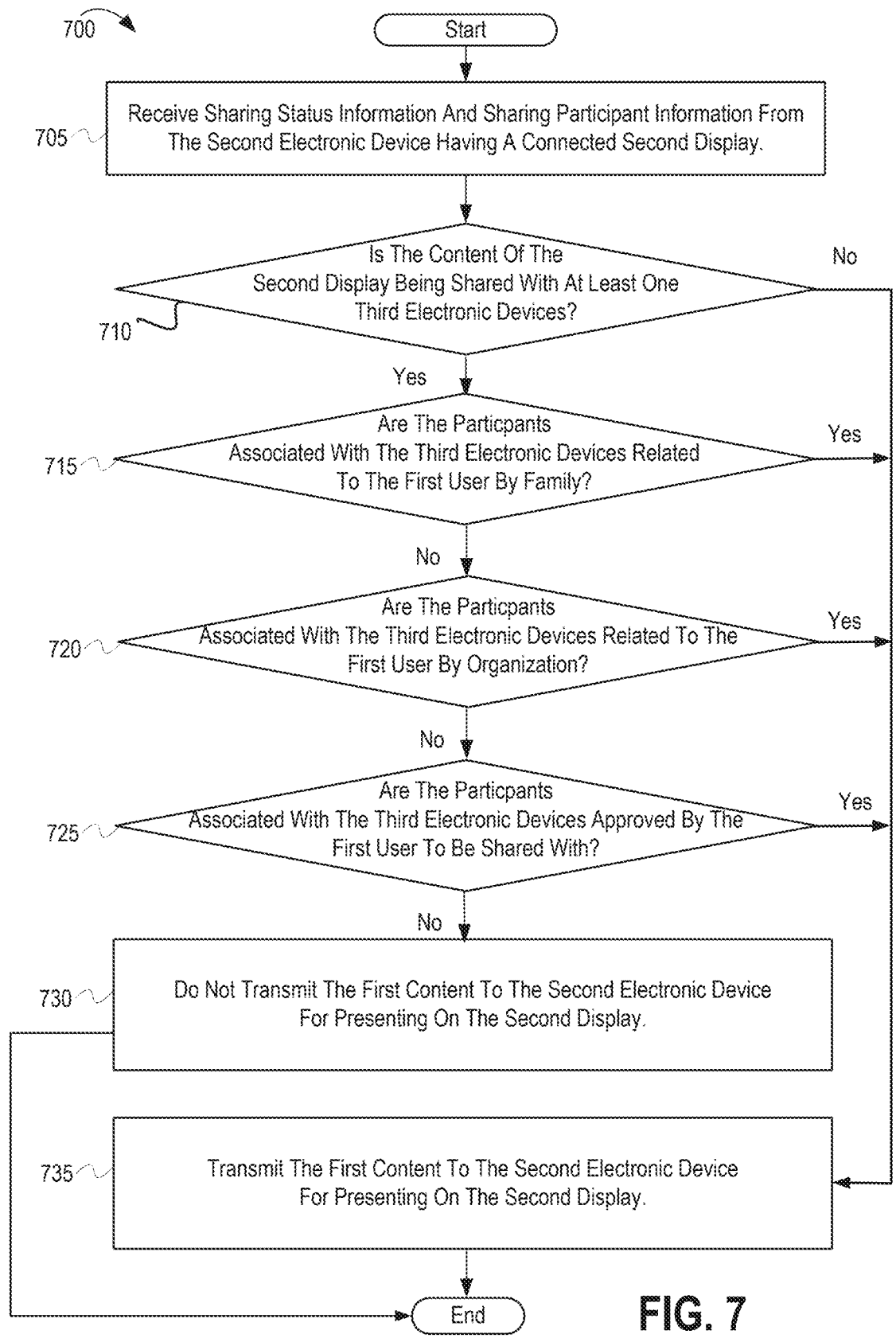
FIG. 7 depicts an example method for determining whether to project the content from the electronic device to the second display that is being shared, based on identifying a specific type of relationship that exists between a user of the electronic device and the participants associated with the at least one third electronic device, according to one or more embodiments.

FIGS. 5-7 depict flow diagrams of different methods for determining whether to project a selected content to a second display of a second electronic device, according to respective embodiments. The methods are implemented to enable projection/mirroring of the selected content or to withhold/abort the projection/mirroring of the selected content when the second display is sharing second display content to one or more sharing participants associated with third electronic device(s). In at least one embodiment, the electronic device 100 is controlled by processor 102, which executes code of the PSM module 126 (FIG. 1) and the sharing inquiry module 127 and is configured to cause the electronic device 100 to perform the functionality described for method 500 (FIG. 5), method 600 (FIG. 6), as well as method 700 (FIG. 7). Some of the described processes can be performed by the AI engine 135, operating within electronic device 100.

The description of methods 500/600/700 is provided with general reference to the specific components illustrated within the preceding FIGS. 1-4, and specific components referenced in methods 500/600/700 may be identical or similar to components of the same name used in describing preceding FIGS. 1-4.

FIG. 5 depicts an example method for presenting a notification to at least one of a first electronic device and a second electronic device and projecting a selected content from the first electronic device to a second display of the second electronic device based on whether the second display content is being shared with the at least one third electronic device, according to one or more embodiments. The method 500 can be performed using the electronic device 100 of FIG. 1 executing instructions of the PSM module 126 to project/transmit a selected content or first content to a second display of a second electronic device 192. The method 500 starts at block 505 where a trigger is received to project/transmit the first content from a first electronic device 100 to a second electronic device 192 for presentation on the second display 225A (FIG. 2) of the second electronic device 192. The trigger can be initiated by the user 201 of the first electronic device 100 issuing a projection command via a user interface. Alternatively, the trigger can be automatically generated based on a notification of an incoming message being received and surfaced on display 130A of the electronic device 100. Other types of triggers are also supported.

At block 510, the method 500 includes the processor 102 determining whether the content of the second display 225A is shared with third electronic device(s). The determination can be made before any projection/transmission of the first content is started. In one or more embodiments, the determination can also be made periodically after the projection/transmission of the first content has started. The determination can include transmitting a query to the second electronic device related to the sharing status of the second electronic device with third party devices.

From block 510, when the processor 102 determines that the content of the second display 225A is not shared with any third electronic device(s), the method 500 can continue to block 530 where the projection/transmission of the first content is completed for rendering/presenting within the second display 225A. Method 500 then ends after block 530.

From block 510, when the processor 102 determines that the content of the second display 225A is being shared with at least one third electronic device, the method 500 continues to block 515 where any projection of the first content for rendering/presenting on the second display 225A is withheld/aborted/suspended.

From block 515, the method 500 continues to block 520, where the processor 102 performs operations to generate a first notification 310 (FIG. 3A) to be presented to a user 201 of the first electronic device 100. The first notification 310 indicates that the content of the second display 225A is being shared with at least one third electronic device. The first notification 310 can also include a selectable option to enable the user 201 of the first electronic device 100 to approve/stop the projection/mirroring from proceeding. The method 500 then continues to block 525, where the first notification 310 is presented within the first display 130B (FIG. 3A) of the electronic device 100. As described with FIG. 3B, the processor 102 can optionally perform operations to generate a second notification 360. When there is a second notification 360, the second notification 360 can be transmitted to the second electronic device 192 to be presented within the second display 225B (FIG. 3B) of the second electronic device 192. In one or more embodiments, the same notification (e.g., the first notification 310) can be presented within the first display 130B to the user 201 and transmitted to the second electronic device 192 for presentation within the second display 225B as the second notification 360. Method 500 then ends after block 525.

FIG. 6 depicts an example method for receiving sharing status information and for determining whether to project/transmit the first content from the electronic device 100 to a second device display, according to one or more embodiments. The method 600 can be performed using the electronic device 100 of FIG. 1 executing instructions of the PSM module 126 to transmit/project the first content to a second display. The method 600 starts at block 605 where the sharing status information 128 is received from the second electronic device 192 connected with a second display. The sharing status information 128 is received based on the first electronic device 100 (via the sharing inquiry module 127) generating and transmitting a request to the second electronic device 192 for the sharing status information 128.

At block 610, the method 600 includes the processor 102 determining whether the second display content (or content of the second display 225C) (FIG. 4) is shared with at least one third electronic device. The determination can be made before any projection/transmission of the first content is started. In one or more embodiments, the determination can also be made periodically after the projection/transmission of the first content has started. From block 610, when the content is not shared, the method 600 continues to block 625 where the first content is projected to the second display 225D. The method 600 ends after block 625. From block 610, when the second display content is being shared, the method 600 continues to block 615. An example of a projection/mirroring/transmission of a selected content to a second display when the second display is not being shared with a third electronic device is depicted in FIG. 2.

At block 615, the method 600 includes determining whether the user of the electronic device 100 has been notified and has approved the sharing of the content of the second display 225D (FIG. 4). When the user of the electronic device 100 has not been notified and/or has not approved the sharing, the method 600 continues to block 630 where the projection of the first content is withheld/aborted, and there is no rendering or projection of the first content within the second display 225D. The method 600 ends after block 630. An example of a stoppage of a projection of a selected content to a second display when the second display is being shared with a third electronic device is depicted in FIG. 4.

At block 615, when the user of the electronic device 100 has been notified and has approved the sharing, the method 600 can optionally continue to block 620 (shown in hyphenated lines) where method 600 includes determining whether the electronic device 100 has received approval to share via the selectable option 365 of the second notification 360 (FIG. 3B) from the second electronic device 192. When no approval is received or when the user declines sharing via selection of the selectable option 370 of the second notification 360, the method 600 continues to block 630 where the projection of the first content is withheld/aborted. When an approval is received, the method 600 continues to block 625 where the first content is projected to the second display 225D.

At block 615, when the user of the electronic device 100 has been notified and has approved the sharing, and there is no requirement to wait for an approval related to the second notification 360, the method 600 can continue to block 625 where the first content is projected to the second display 225D. The method 600 ends after block 625.

FIG. 7 depicts an example method for determining whether to project the content from the electronic device to the second display of the second electronic device based on a possible relationship between a user of the electronic device 100 and the sharing participants associated with the third electronic device, according to one or more embodiments. The method 700 can be performed using the electronic device 100 of FIG. 1, with the processor executing code of the screen projection/mirroring module 126 to project/transmit a first content to a second display 225A (FIG. 2). The method 700 starts at block 705 where the sharing status information 128 and the sharing participant information 129 are received from the second electronic device 192 connected with a second display.

At block 710, the method 700 includes the processor 102 determining whether the content of the second display 225A (FIG. 2) is being shared with at least one third electronic device. The determination can be performed before any projection/transmission of the first content is started.

In one or more embodiments, the determination can also be performed periodically after the projection/transmission of the first content has started. From block 710, when the content is not being shared, the method 700 continues to block 735 where the first content is projected/transmitted to the second display 225D. The method 700 ends after block 735. From block 710, when the content of the second display 225A is being shared, the method 700 continues to block 715. An example of a projection of a selected content to a second display when the second display is not being shared with any third electronic devices is depicted in FIG. 2.

At block 715, the method 700 includes the processor 102 determining whether the sharing participants are family members of the user of the electronic device 100. When the sharing participants are family members, the method 700 continues to block 735 where the first content is projected to the second display 225D. In one or more embodiment, this approval for family sharing of projected/mirrored content is, in part triggered by a setting provided by the user of the electronic device (e.g., during set up of the features described herein) to assign a safe sharing rating to specific family members, such that no screening of notifications or application content are required for those family members. When the sharing participants are not family members, the method 700 continues to block 720.

At block 720, the method 700 includes the processor 102 determining whether the sharing participants belong to the same organization as the user of the electronic device 100. When the sharing participants belong to the same organization as the user of the electronic device 100, the method 700 continues to block 735 where the first content is projected to the second display 225D. When the sharing participants do not belong to the same organization as the user of the electronic device 100, the method 700 continues to block 725.

At block 725, the method 700 includes the processor 102 determining whether the sharing participants are people who have been approved by the user of the electronic device 100 for the first content to be exposed to. When the sharing participants have been approved for sharing of the first content, the method 700 continues to block 735 where the first content is projected/transmitted to the second display 225D. When the sharing participants have not been approved, the method 700 continues to block 730 where the first content is not projected to the second display 225D. An example of a stoppage of projection of a selected content to a second display when the second display is not being shared with any third electronic device is depicted in FIG. 4. The method 700 ends after block 730.

According to one or more embodiments, one or more of methods 500/600/700 further include the processor executing code to transmit, to a sharing module of the second electronic device, a preview notification that triggers surfacing on the second display of a second notification informing a user of the second electronic device that a copy of a first user interface being provided at the electronic device is going to be presented on the second display and shared with a third electronic device. The processor further executes code to trigger the sharing module at the second electronic device to include within the second notification a request for an approval indication from a user of the second electronic device, the approval indication specifying that the second electronic device is ready to receive and share the projection of the first content from the electronic device. In response to receiving the approval indication from the second electronic device, the processor executes code to project the first content to the second display of the second electronic device. In response to not receiving the approval indication from the second electronic device, the processor executes codes to cancel a projection of the first content for presentation on the second display.

One or more of the methods 500/600/700 further include the processor executing code to project the first content to the second display by performing at least one of mirroring operations, casting operations, virtual phone operations, desktop operations, and streaming operations of the content of the display of the electronic device 100 to the second display.

One or more of the methods 500/600/700 further include the processor executing code to perform one or more operations to enable the user of the electronic device 100 to implicitly or explicitly approve the sharing participants such that the selected content (or first content) can be exposed or available to the sharing participants. For each type of approval, the processor 102 (or the AI engine 135) analyzes the sharing participant information received from the second electronic device 192 to determine whether the sharing participants are people who are associated with the user of the electronic device 100 by family relationship, by organization relationship, or by explicit approval provided by the user of the electronic device 100.

One or more of the methods 500/600/700 further include the processor 102, in response to determining that the content presented on the second display is currently being shared with at least one third electronic device, withholding automatic rendering of the first content on the second display, and generating and outputting a notification presented on at least the first display, the notification informing a user of at least one of the electronic device and the second electronic device that the content presented on the second display is being shared. The notification helps prevent the user of the at least one of the electronic device and the second electronic device from inadvertently sharing content from the first electronic device with participants associated with the third electronic device(s) when the content from the first electronic device is not intended to be shared with the participants.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation. Instead, the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application thereof, and to enable others of ordinary skill in the art to understand the innovation for various embodiments with various modifications as are suited to the particular use contemplated.

What is claimed is:

1. An electronic device comprising:
    a first display that is configurable to display one or more content;
    a communications subsystem configurable to connect the electronic device to at least one second electronic device and support content sharing from the electronic device to a second display of the second electronic device; and
    a controller communicatively connected to the first display and the communications subsystem, and which is configured to cause the electronic device to:
        in response to a trigger to transmit first content of the electronic device to a connected second electronic device for presenting on a second display:
            determine whether second display content is currently being shared with at least one third electronic device; and
            in response to determining that the second display content is currently being shared with at least one third electronic device:
                withhold automatic rendering of the first content on the second display; and
                generate and output a notification presented on at least the first display, the notification informing a user of at least one of the electronic device and the second electronic device that the content presented on the second display is being shared.

2. The electronic device of claim 1, wherein the controller further configures the electronic device to automatically project a copy of the first content to a window provided on the second display when the second display content is not being shared with the at least one third electronic device.

3. The electronic device of claim 1, wherein to determine whether the second display content is currently being shared with at least one third electronic device, the controller configures the electronic device to:
    initiate a sharing connection with the second electronic device;
    prompt for sharing status information from the second electronic device, the sharing status information indicating one of (i) the second display content is being shared in its entirety with the at least one third electronic device, (ii) a portion of the second display content is being shared with the at least one third electronic device, and (iii) the second display content is not being shared with the at least one third electronic device; and
    initiate generation of the notification, based on the sharing status information indicating one of (i) the second display content is being shared in its entirely with the at least one third electronic device and (ii) a portion of the second display content is being shared with the at least one third electronic device.

4. The electronic device of claim 1, wherein the controller further configures the electronic device to:
    present, with the notification, selectable options for controlling projection of the first content from the first display to the second display of the second electronic device;
    in response to receiving a first selection that indicates an agreement by the user of the electronic device to proceed with presenting the first content, project the first content to the second display.

5. The electronic device of claim 4, wherein to project the first content to the second display the controller further configures the electronic device to:
    transmit, to a sharing module of the second electronic device, a preview notification that triggers surfacing on the second display of a second notification informing a user of the second electronic device that a copy of a first user interface being provided at the electronic device is going to be presented on the second display and shared with the at least one third electronic device;
    trigger the sharing module at the second electronic device to include within the second notification an approval indication from a user of the second electronic device, the approval indication specifying the second electronic device being ready to receive and share the projection of the first content from the electronic device;

in response to receiving the approval indication from the second electronic device, project the first content for presentation on the second display of the second electronic device; and in response to not receiving the approval indication from the second electronic device, cancel a projection of the first content for presentation on the second display.

6. The electronic device of claim 1, wherein to determine whether the second display content is being shared with the third display electronic device, the controller configures the electronic device to:

request, from the second electronic device, a sharing status of the second electronic device; and determine from the sharing status whether the second electronic device is sharing the second display content in its entirety or only a portion of the second display content with the at least one third electronic device.

7. The electronic device of claim 6, wherein:

the sharing status comprises participant information identifying one or more participants that the second electronic device is sharing the second display content with; and the controller further configures the electronic device to:
  determine, using the participant information, whether the one or more participants is related to a user of the electronic device; and
  in response to determining that the one or more participants is related to the user of the electronic device, trigger a projecting of the first content to the second display.

8. The electronic device of claim 7, wherein the one or more participants is related to the user of the electronic device based on the user of the electronic device approving the second display content to be shared with the one or more participants.

9. The electronic device of claim 7, wherein to project the first content to the second display, the controller configures the electronic device to perform at least one of mirroring operations, casting operations, virtual phone operations, desktop operations, and streaming operations of the display of the electronic device to the second display.

10. A method comprising:

receiving a trigger to transmit first content of an electronic device to a connected second electronic device for presenting on a second display;

determining whether second display content is currently being shared with at least one third electronic device; and in response to determining that the second display content is currently being shared with at least one third electronic device:
  withholding automatic rendering of the first content on the second display; and
  generating and outputting a notification presented on at least the first display, the notification informing a user of at least one of the electronic device and the second electronic device that the content presented on the second display is being shared.

11. The method of claim 10, further comprising automatically projecting a copy of the first content to a window provided on the second display when the second display content is not being shared with the at least one third electronic device.

12. The method of claim 10, wherein determining whether the second display content is currently being shared with the at least one third electronic device comprises:

initiating a sharing connection with the second electronic device;

prompting for sharing status information from the second electronic device, the sharing status information indicating one of (i) the second display content is being shared in its entirety with the at least one third electronic device, (ii) a portion of the second display content is being shared with the at least one third electronic device, and (iii) the second display content is not being shared with the at least one third electronic device; and initiating generation of the notification, based on the sharing status information indicating one of (i) the second display content is being shared in its entirely with the at least one third electronic device and (ii) a portion of the second display content is being shared with the at least one third electronic device.

13. The method of claim 10, further comprising:

presenting, with the notification, selectable options for controlling projection of the first content from the first display to the second display of the second electronic device;

in response to receiving a first selection that indicates an agreement by the user of the electronic device to proceed with presenting the first content, projecting the first content to the second display.

14. The method of claim 13, wherein projecting the first content to the second display comprises:

transmitting, to a sharing module of the second electronic device, a preview notification that triggers surfacing on the second display of a second notification informing a user of the second electronic device that a copy of a first user interface being provided at the electronic device is going to be presented on the second display and shared with the at least one third electronic device;

triggering the sharing module at the second electronic device to include within the second notification an approval indication from a user of the second electronic device, the approval indication specifying the second electronic device being ready to receive and share the projection of the first content from the electronic device;

in response to receiving the approval indication from the second electronic device, projecting the first content for presentation on the second display of the second electronic device; and in response to not receiving the approval indication from the second electronic device, cancelling a projection of the first content for presentation on the second display.

15. The method of claim 10, wherein determining whether the second display content is being shared with the third display electronic device comprises:

requesting, from the second electronic device, a sharing status of the second electronic device; and determining from the sharing status whether the second electronic device is sharing the second display content in its entirety or only a portion of the second display content with the at least one third electronic device.

16. The method of claim 15, wherein the sharing status comprises participant information identifying one or more participants that the second electronic device is sharing the second display content with; and the method further comprising:

determining, using the participant information, whether the one or more participant is related to a user of the electronic device; and in response to determining that the one or more participants is related to the user of the electronic device, triggering a projecting of the first content to the second display.

17. The method of claim 16, wherein the one or more participants is related to the user of the electronic device based on the user of the electronic device approving the second display content to be shared with the one or more participants.

18. The method of claim 17, wherein projecting the first content to the second display comprises performing at least one of mirroring operations, casting operations, virtual phone operations, desktop operations, and streaming operations of the display of the electronic device to the second display.

19. A computer program product comprising:

a computer readable storage device; and program code on the computer readable storage device that when executed by a processor associated with an electronic device, the program code enables the electronic device to provide functionality of:

receiving a trigger to transmit first content of the electronic device to a connected second electronic device for presenting on a second display;

determining whether second display content is currently being shared with at least one third electronic device; and in response to determining that the second display content is currently being shared with at least one third electronic device:

withholding automatic rendering of the first content on the second display; and generating and outputting a notification presented on at least the first display, the notification informing a user of at least one of the electronic device and the second electronic device that the content presented on the second display is being shared.

20. The computer program product of claim 19, wherein the program code for determining whether the second display content is currently being shared with the at least one third electronic device comprises program code that enables the electronic device to provide functionality of:

initiating a sharing connection with the second electronic device;

prompting for sharing status information from the second electronic device, the sharing status information indicating one of (i) the second display content is being shared in its entirety with the at least one third electronic device, (ii) a portion of the second display content is being shared with the at least one third electronic device, and (iii) the second display content is not being shared with the at least one third electronic device; and initiating generation of the notification, based on the sharing status information indicating one of (i) the second display content is being shared in its entirely with the at least one third electronic device and (ii) a portion of the second display content is being shared with the at least one third electronic device.

\* \* \* \* \*